US012763810B2

(12) United States Patent
Bhat et al.

(10) Patent No.: US 12,763,810 B2
(45) Date of Patent: Oct. 13, 2026

(54) RADIO FREQUENCY TRANSMIT/RECEIVE SWITCH WITH COUPLED TRANSMISSION LINES

(71) Applicant: Intel Corporation, Santa Clara, CA (US)

(72) Inventors: Ritesh A. Bhat, Portland, OR (US); Steven Callender, Denver, CO (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 18/147,721

(22) Filed: Dec. 29, 2022

(65) Prior Publication Data

US 2024/0223235 A1 Jul. 4, 2024

(51) Int. Cl.
*H04B 1/44* (2006.01)
*H04B 1/04* (2006.01)

(52) U.S. Cl.
CPC ............. *H04B 1/44* (2013.01); *H04B 1/0483* (2013.01)

(58) Field of Classification Search
CPC ........... H04B 1/44; H04B 1/0483; H04B 1/48
See application file for complete search history.

(56) References Cited

U.S. PATENT DOCUMENTS 8,299,835 B2 * 10/2012 Koudymov .......... H03K 17/063 333/103
10,171,114 B2 * 1/2019 Cheon .................. H04B 1/0057
10,720,956 B2 * 7/2020 Callender ................. H03F 3/21
12,413,259 B2 * 9/2025 Din .......................... H04B 1/44
2007/0232241 A1 * 10/2007 Carley ..................... H04B 1/44 455/83
2012/0083224 A1 * 4/2012 Visser .................... H04B 1/525 455/83
2013/0215808 A1 * 8/2013 Muthukrishnan ...... H02H 9/046 370/297

(Continued)

OTHER PUBLICATIONS

Wen-Chian Lai et al., "75-110-GHz W-band High-Linearity Traveling-Wave T/R Switch by Using Negative Gate/Body-Biasing in 90-nm CMOS", IEEE Microwave and Wireless Components Letters, vol. 27, No. 5, May 2017, 3 pages.

(Continued)

*Primary Examiner* — Kenneth T Lam
(74) *Attorney, Agent, or Firm* — VIERING, JENTSCHURA & PARTNER mbB

(57) ABSTRACT

Disclosed herein is a radio frequency (RF) circuit for a transmit/receive switch that includes an antenna coupled to a receive path through a first coupled transmission line. The antenna is also coupled to a transmit path through a second coupled transmission line. The RF circuit includes a receiver switch configured to selectively present to the receive path a high impedance or a low impedance to ground and a transmitter switch configured to selectively present to the transmit path a high impedance or a low impedance to ground. The receiver switch and/or transmitter switch may be independently supplied with a bias voltage that depends on whether the circuit is operating in a transmit mode or receive mode. The RF circuit may have improved insertion loss, bandwidth, and linearity, while also providing robustness to electrostatic discharge (ESD).

23 Claims, 6 Drawing Sheets

(56) References Cited

U.S. PATENT DOCUMENTS

| | | | | |
|---|---|---|---|---|
| 2014/0170990 A1* | 6/2014 | Black | H04B 1/401 455/73 |
| 2014/0327494 A1* | 11/2014 | Sato | H03H 7/38 333/124 |
| 2016/0093948 A1* | 3/2016 | Lehtola | H01Q 5/321 343/852 |
| 2018/0375488 A1* | 12/2018 | Sira | H04B 1/0458 |
| 2020/0083924 A1* | 3/2020 | Callender | H03F 3/21 |

OTHER PUBLICATIONS

Mehmet Uzunkol et al., "140-220 GHz SPST and SPDT Switches in 45 nm CMOS SOI", IEEE Microwave and Wireless Components Letters, vol. 22, No. 8, Aug. 2012, 3 pages.
Xinyan Tang et al., "A 140 GHz T/R Front-End Module in 22 nm FD-SOI CMOS", 2021 IEEE Radio Frequency Integrated Circuits Symposium (RFIC), DOI: 10.1109/RFIC51843.2021.9490470.
Ruei-Bin Lai et al., "A 60-110 GHz Transmission-Line Integrated SPDT Switch in 90 nm CMOS Technology", IEEE Microwave and Wireless Components Letters, vol. 20, No. 2, Feb. 2010, 3 pages.
Fanyi Meng et al., "Monolithic Sub-Terahertz SPDT Switches With Low Insertion Loss and Enhanced Isolation", IEEE Transactions on Terahertz Science and Technology, vol. 8, No. 2, Mar. 2018, 9 pages.
Ran Shu et al., "A Transformer-Based V-Band SPDT Switch", IEEE Microwave and Wireless Components Letters, vol. 27, No. 3, Mar. 2017, 3 pages.
Stefano Pellerano et al., "A Scalable 71-to-76GHz 64-Element Phased-Array Transceiver Module with 2×2 Direct-Conversion IC in 22nm FinFET CMOS Technology", 2019 IEEE International Solid-State Circuits Conference, Sessioni 9, High-Frequency Transceivers for Radar and Communications, 9.7, 3pages.
Wei Zhu et al., "A 1V W-Band Bidirectional Transceiver Front-End with <1dB T/R Switch Loss, <1°/dB Phase/Gain Resolution and 12.3% TX PAE at 15.1dBm Output Power in 65nm CMOS Technology", 2021 IEEE International Solid-State Circuits Conference, Session 14, mm-WAVE Transceivers for Communication and Radar, 14.5, 3 pages.

* cited by examiner

RADIO FREQUENCY TRANSMIT/RECEIVE SWITCH WITH COUPLED TRANSMISSION LINES

TECHNICAL FIELD

The disclosure relates generally to radio frequency (RF) devices that utilize transmit/receive switches to allow an RF transmitter and an RF receiver to share a single antenna or other off-chip RF interface.

BACKGROUND

Wireless devices that transmit and receive RF signals often do so via a common antenna that is shared between the transmitter and receiver. In order to share a single antenna, a switching mechanism is often required to switch the antenna to the transmitter when the device is in a transmission mode and switch the antenna to the receiver when the device is in a receiver mode. Such a switch may be referred to as a transmit/receive switch (TRSW), and it may be a front-end component of many RF systems, including, for example, a time-division duplex (TDD) system. Because a TRSW is directly part of the RF path, the overall performance of the TRSW has direct impact on, on the transmit side (TX), output power and linearity and, on the receive side (RX), on noise figure and linearity. If the performance of the TRSW is poor (e.g., a high insertion loss and/or poor linearity), there may be a direct impact to transmitter and receiver performance. Often, the TRSW may even have a two-fold impact in the overall system link because RF signals may pass through the TRSW twice when considering a full TX-to-RX link—once on the transmit side and once on the receive side.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
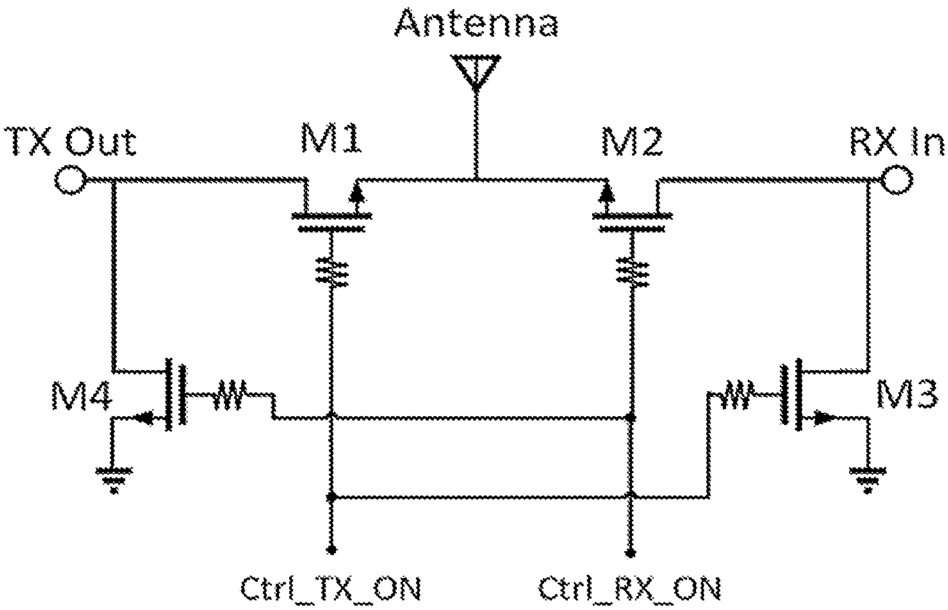
(prior art) FIG. 1
FIG. 1 shows an example of a conventional series/series-shunt TRSW circuit.

The following detailed description refers to the accompanying drawings that show, by way of illustration, exemplary details and features.

The word “exemplary” is used herein to mean “serving as an example, instance, or illustration.” Any aspect or design described herein as “exemplary” is not necessarily to be construed as preferred or advantageous over other aspects or designs.

Throughout the drawings, it should be noted that like reference numbers are used to depict the same or similar elements, features, and structures, unless otherwise noted.

The phrase “at least one” and “one or more” may be understood to include a numerical quantity greater than or equal to one (e.g., one, two, three, four, [ . . . ], etc.). The phrase “at least one of” with regard to a group of elements may be used herein to mean at least one element from the group consisting of the elements. For example, the phrase “at least one of” with regard to a group of elements may be used herein to mean a selection of: one of the listed elements, a plurality of one of the listed elements, a plurality of individual listed elements, or a plurality of a multiple of individual listed elements.

The words “plural” and “multiple” in the description and in the claims expressly refer to a quantity greater than one. Accordingly, any phrases explicitly invoking the aforementioned words (e.g., “plural [elements]”, “multiple [elements]”) referring to a quantity of elements expressly refers to more than one of the said elements. For instance, the phrase “a plurality” may be understood to include a numerical quantity greater than or equal to two (e.g., two, three, four, five, [ . . . ], etc.).

The phrases “group (of)”, “set (of)”, “collection (of)”, “series (of)”, “sequence (of)”, “grouping (of)”, etc., in the description and in the claims, if any, refer to a quantity equal to or greater than one, i.e., one or more. The terms “proper subset”, “reduced subset”, and “lesser subset” refer to a subset of a set that is not equal to the set, illustratively, referring to a subset of a set that contains less elements than the set.

The term “data” as used herein may be understood to include information in any suitable analog or digital form, e.g., provided as a file, a portion of a file, a set of files, a signal or stream, a portion of a signal or stream, a set of signals or streams, and the like. Further, the term “data” may also be used to mean a reference to information, e.g., in the form of a pointer. The term “data”, however, is not limited to the aforementioned examples and may take various forms and represent any information as understood in the art.

The terms “processor” or “controller” as, for example, used herein may be understood as any kind of technological entity (e.g., hardware, software, and/or a combination of both) that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, software, firmware, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both "direct" calculations via a mathematical expression/formula/relationship and 'indirect' calculations via lookup or hash tables and other array indexing or searching operations.

As noted above, a transmit/receive switch (TRSW) may be a key front-end component of many RF devices and the performance of the TRSW, in terms of insertion loss, linearity, etc., may have a direct impact to on the device's transmitter and receiver performance because a TRSW is directly part of the RF path. If the performance of the TRSW is poor (e.g., the TRSW has a high insertion loss and/or poor linearity), there may be a two-fold impact in the overall system link because signals may pass through the TRSW twice. Similarly, performance improvements to the TRSW performance may be doubly impactful. As such, it is desirable for a TRSW to have a low insertion loss and high linearity.

In addition to low loss and high linearity, it is also desirable for the TRSW to be galvanically isolated from the antenna/output port to help protect the TRSW from any electrostatic discharge (ESD) or other charge build-up events that may occur on the antenna/output port. Often, providing galvanic isolation comes at the expense of the TRSW having a higher insertion loss, lower bandwidth, etc., trading off transmit/receive performance for a more robust and reliable design with respect to ESD.

In the TRSW circuit disclosed in more detail below, it employs RF-coupled transmission lines (e.g., coupled-lines or coupled transmission lines) to provide the impedance transformations for the particular operating mode of the wireless device (e.g., a TX mode or an RX mode), while also reducing the non-linear effects that may be introduced by placing an active switch in the RF path. In addition, the coupled-lines galvanically isolate the active switches from the output port (e.g., the antenna or other output port), to preserve reliability and provide robustness while still allowing for a lower insertion loss implementation as compared to conventional TRSW circuits.

Conventional TRSW implementations typically have a higher insertion loss and may not be as reliable in terms of linearity and galvanic isolation. Four types of conventional TRSW implementations are each described in more detail below with reference to corresponding figure(s).

As shown in FIG. 1, for example, a typical implementation of a conventional TRSW circuit includes two series switches (M1 and M2)—one switch between the TX Out port (e.g., an output of a power amplifier (PA)) to the antenna port, and the other switch between the RX In port (e.g., an input to a linear noise amplifier (LNA)) from the antenna port). The switches operate in a complementary, exclusive manner allowing either the conduction of RF signals from the PA to the antenna port (e.g., in a TX mode) or the conduction of RF signals from the antenna port to the LNA (e.g., in an RX mode) at any given time. More advanced versions of this type of implementation may include optional shunt switches (M3 and M4) to help improve the TX-to-RX isolation. For example, M3 conducts simultaneously with M1, while M4 conducts simultaneously with M2. The main disadvantage of this approach, however, is the presence of a series switch directly on the RF signal path. The finite ON resistance of the switch dissipates signal energy as heat and may decrease the amount of signal power delivered to the antenna in TX mode or delivered to the LNA in RX mode (e.g., contributing to a higher insertion loss). Typically, this parasitic effect is mitigated by minimizing the series switch resistance, usually by increasing the device size. For arbitrarily large device sizes, the switch resistance will ultimately be limited by device interconnect resistance, requiring careful layout optimization of the switch device. The practical switch device size will also be limited by the parasitic capacitance of the device, as this may limit the frequency of operation for the TRSW.

For an ON switch, the drain-to-bulk capacitance will need to be absorbed into the TX/RX matching networks. This adds additional constraints to the matching network design, decreases the obtainable bandwidth, and could potentially lead to an unrealizable matching network at mmWave frequencies, requiring the switch size to be further reduced which will further increase insertion loss.

For an OFF switch, the drain-to-source capacitance, $C_{ds}$, will limit the amount of TX-to-RX isolation since the signal can couple from port-to-port through the capacitance. Limited isolation is a drawback because a TRSW would ideally have infinite isolation (e.g., no signal coupling between TX and RX ports). Large switches will have larger $C_{ds}$ and therefore higher TX-to-RX coupling at a fixed frequency.

The higher the TX-to-RX coupling, the lower the amount of power delivered to/from the antenna port (e.g., higher insertion loss).

To help improve the TX-to-RX isolation, the same type of shunt switches shown in FIG. 1 (e.g., M3 and M4) may be added. However, such switches may add additional parasitic capacitance on the TX and RX ports in their OFF state, thereby increasing the difficulty of designing the TX/RX matching networks as previously discussed (e.g., resulting in reduced bandwidth and potentially unrealizable matching network).

As another drawback, having an active switch on the RF/mmWave signal path may limit the linearity of the transceiver because nonlinearities of the active switch may add to the RF signal. Furthermore, the maximum swing at the antenna port may be limited by the OFF switch in the inactive path. The gate of this off switch will be effectively tied to ground (GND) while the drain is exposed to the full positive and negative RF signal swing at the antenna port. A negative RF swing with a magnitude larger than the threshold voltage of the device may actually turn ON the switch and clip the amplitude of the RF signal during the negative half of the signal cycle, severely distorting the waveform and limiting attainable linear RF output power. The typical insertion loss for this type of architecture in, for example, 90 nm CMOS is 3-4 dB at 60-80 GHz.

Figure 2:
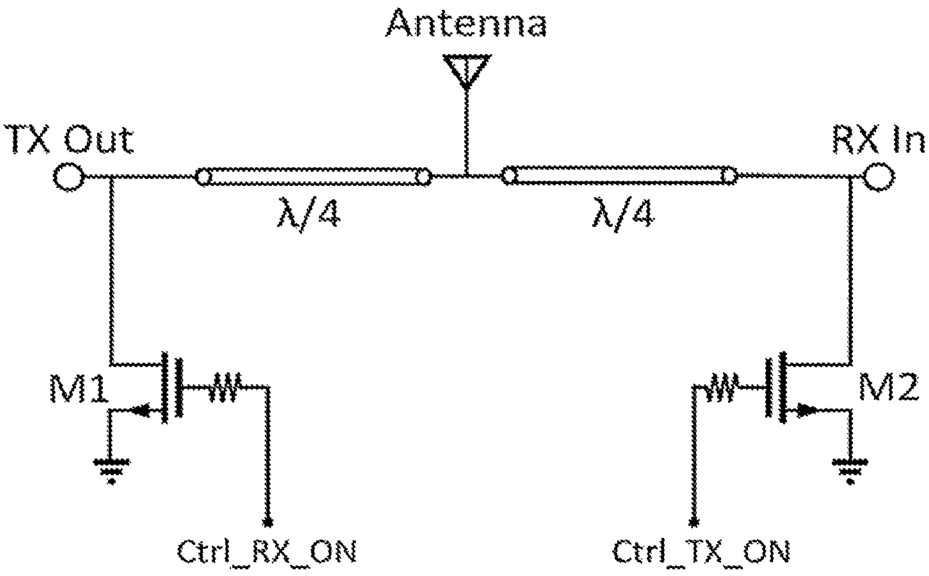
(prior art) FIG. 2
FIG. 2 shows an example of a conventional shorted quarter-wave transmission line TRSW circuit.

As another example, shown in FIG. 2, a typical TRSW may use shorted quarter-wavelength (λ/4) RF transmission lines, one between the antenna and each of the TX/RX ports. Each transmission line is typically impedance matched to 50Ω and terminated with a switch device (M1 and M2) on the end that is connected to the TX/RX port. These RF switch devices appear in shunt with the TX (output of PA) and RX (input to LNA) ports. When in transmit mode, the switch connected to the RX port is turned ON, deactivating the receiver. When in receive mode, the switch connected to the TX port is turned ON, deactivating the transmitter. The impedance transformation properties of the transmission line may transform the low impedance (e.g., ideally zero) of the ON switch to a high impedance (e.g., ideally infinite) when viewed at the antenna port, thereby minimizing the loading of the active path to the antenna. To perform this "short-to-open" impedance transformation, the length of the transmission line must be λ/4, where λ is the wavelength of the RF frequencies of interest (e.g., in the RF frequency band of the transmitter/receiver). This approach is more popular at high frequencies due to the possibility of a compact implementation of the λ/4 transmission-lines.

The shorted transmission-line of this implementation may mitigate the series-loss concern of the series/shunt switch approach (discussed above with respect to FIG. 1) while also decoupling the TX/RX matching network design from that of the TRSW design because a broadband 50Ω impedance is presented on the active path and the parasitic capacitance of the OFF switch devices may be absorbed into distributed inductance and capacitance of the transmission line with much lower impact on bandwidth as compared to the approach discussed with respect to FIG. 1. The main disadvantage of the type of transmission-line based TRSW shown in FIG. 2 is the consumption of area that may be required to lay out the transmission lines on the RF chip/board. As noted above, the length of the transmission line is proportional to the wavelength, λ, which is inversely proportional to the frequency of operation. As a result, it becomes increasingly difficult to justify this implementation at lower frequencies because the layout area of the transmission-line can become prohibitively large. Another disadvantage is that the type of transmission-line based TRSW shown in FIG. 2 may expose the shunt switches to ESD events that may occur on the antenna port. This is because the transmission lines provide a direct current (DC) connection between antenna port and shunt switches (e.g., a drain of the shunt switches). This means that there is no galvanic isolation between the switching devices and the antenna, and this architecture may have poor reliability. The typical insertion loss for this architecture in 90 nm CMOS is 1.5 dB at 60-80 GHz.

Figure 3A:
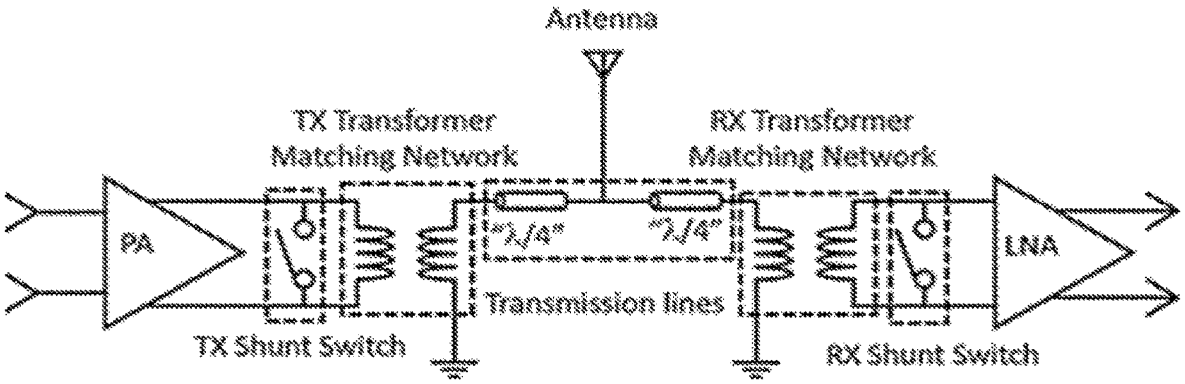
(prior art) FIG. 3A
FIGS. 3A-3B show different examples of conventional shorted quarter-wave transmission line TRSW circuits with galvanic isolation circuitry.
Figure 3B:
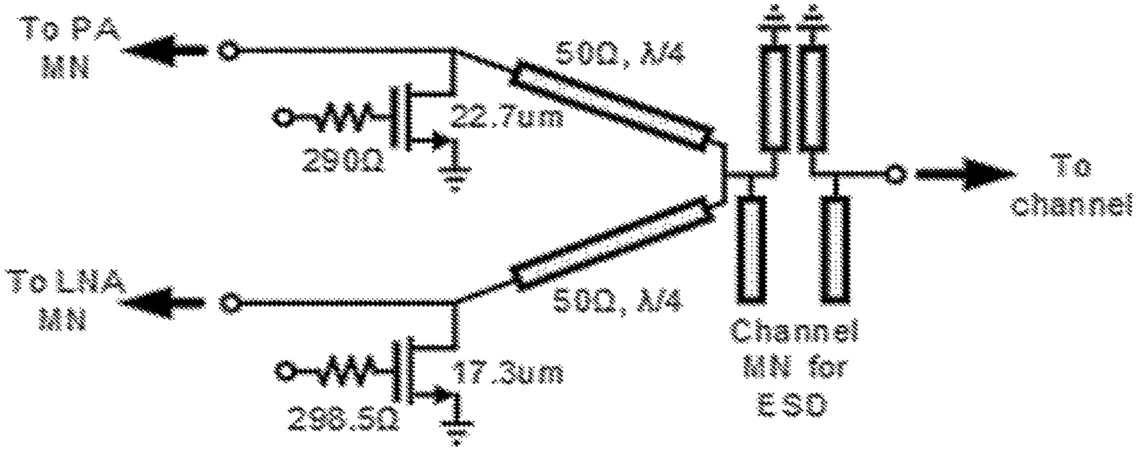
(prior art) FIG. 3B

As shown in FIGS. 3A-3B, a typical TRSW may use a λ/4 transmission line with added galvanic isolation. FIGS. 3A-3B shows two types of modifications over the λ/4 line architecture discussed above with respect to FIG. 2, where the modifications in FIGS. 3A-3B provide galvanic isolation from the antenna to the shunt switches. In FIG. 3A, the switches are placed on the other side of the internal transformer matching networks of the PA/LNA, while in FIG. 3B, an additional passive MN (labeled "channel MN for ESD" in FIG. 3B) at the output of the original TRSW is introduced to provide the isolation. Although these types of architectures may beneficially provide an ESD-robust front-end, both come at the cost of additional insertion loss and/or other design constraints that may degrade system performance, especially for higher frequency applications (e.g., mmWave and subTHz). In FIG. 3A, for example, the shunt switch is now directly in parallel with the PA device, which may limit the size of the core PA device because the amount of device capacitance on that node is limited by the size of inductance that may be realized efficiently for the primary side of the transformer. This results in a constraint on either the maximum PA device size or on a maximum size of the RF shunt switch that may be used, resulting in either lower power from the PA or a degraded OFF impedance in RX mode and thus higher RX insertion loss. For the example of FIG. 3B, the device sizing of the PA is not further constrained, as with FIG. 3A, but the additional passive network (labeled "channel MN for ESD") may further introduce front-end losses as compared to the traditional λ/4 transmission line (discussed, e.g., in FIG. 2 above) and also reduce bandwidth.

In contrast to the conventional approaches of FIGS. 1, 2, 3A, and 3B, the TRSW circuit discussed in more detail below, and an example of which is discussed with respect to FIG. 4, may improve insertion loss, bandwidth, and linearity, while also providing for ESD-robustness. The disclosed TRSW may included coupled transmission lines that implement a λ/4 impedance transformation and may also include an adjustable bias network that may selectively adjust the drain bias of the shunt switch devices on the RF path. The coupled transmission lines provides galvanic isolation, so there may be no need to include an additional cascaded passive network (such as that shown in FIG. 3B). The disclosed TRSW may also allow for independent DC biasing of the drains of the respective shunt switches on the RX/TX paths. Linearity may be improved by independently biasing the drain voltage of the RF shunt switches to an appropriate voltage level (e.g., typically to $V_{dd}$), which may result in greater than 5 dB linearity improvement. This may be especially advantageous for high output power transmitters because at high powers, a non-linear TRSW may otherwise be the bottleneck on output linearity and may ultimately limit the usable output power for the full transmitter.

As used herein, the term "coupled transmission line" or "coupled-lines" may be understood as two RF-conductive transmission lines in proximity to each other such that the RF signal applied to one line is coupled to its proximate line.

Coupled-lines may be identified by inspection of the die-connection made on, for example, different layers on either end of the transmission line. The RF-conductive lines may also be the same layer, for example, or two separate metal layers in an RF board layer stack, often implemented on the thicker metal layers, and may be located close to an antenna (or other output) port of the transmit/receive path of the wireless system.

Figure 4:
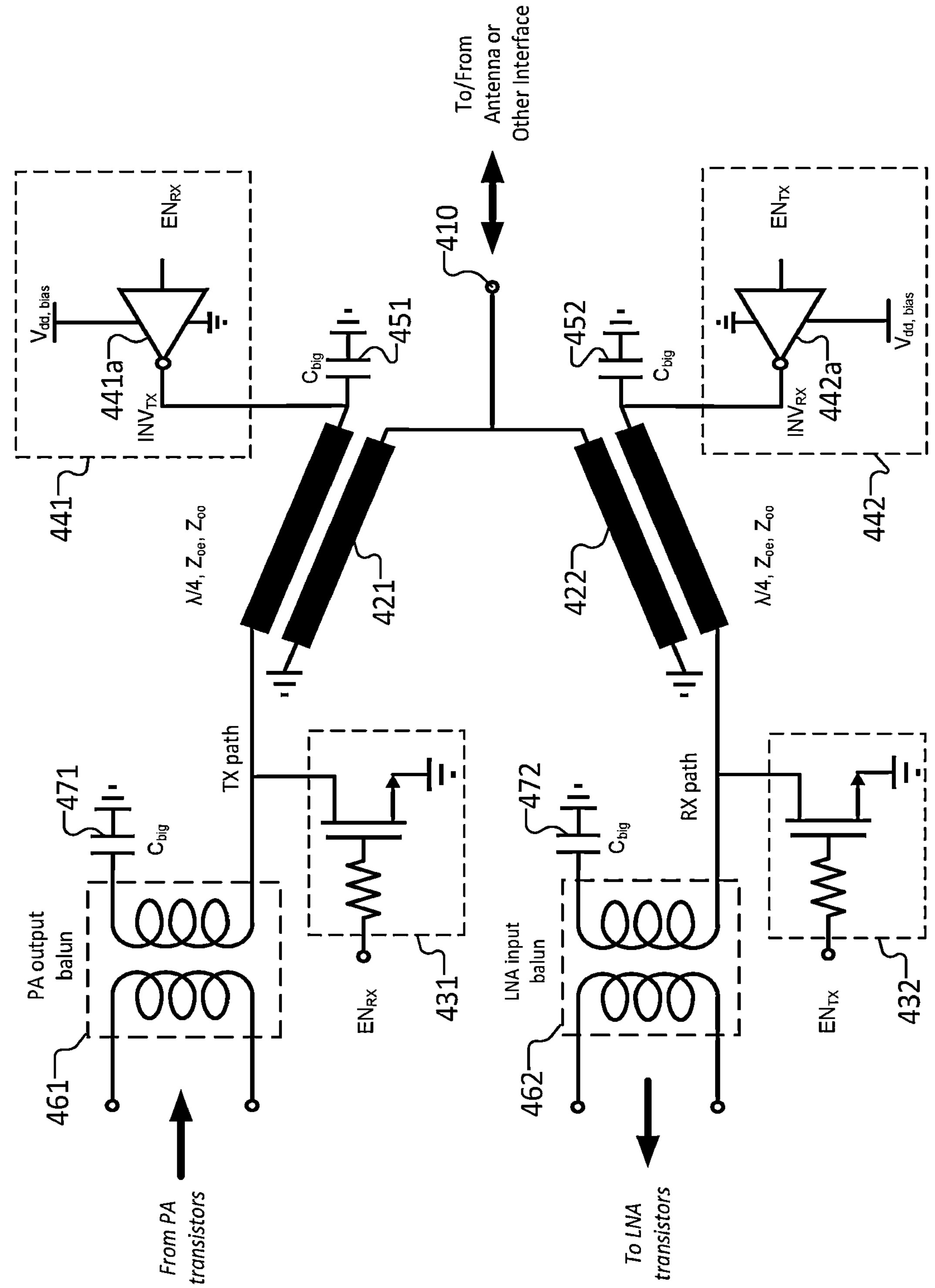
FIG. 4 shows an exemplary improved TRSW circuit that may provide low insertion loss, improved linearity, and galvanic isolation.

An example of the disclosed TRSW circuit is shown in FIG. 4, where the TRSW circuit includes coupled transmission lines and a selectively adjustable bias network for biasing the RF switch architecture on the TX and RX paths. An antenna port 410 (or other RF interface port) supports RF transmissions via a TX path (e.g., from a power amplifier through a PA output balun 461 from a transmitter) and RF receptions via an RX path (e.g., to LNA transistors through an LNA input balun 462). Coupled transmission lines 421 may connect the antenna port 410 to the TX path and provide a λ/4 impedance transformation. Coupled transmission lines 422 may connect the antenna port 410 to the RX path and provide a λ/4 impedance transformation. The TX path may also include a TX switch 431 that may switch on and off RF transmissions along the TX path by selectively shunting the RF TX signals to ground (e.g., when the TRSW circuit is in a receive mode). The TX switch 431 may be biased with a TX bias voltage provided by an adjustable TX bias circuit 441 that is configured to selectively apply a DC voltage to the TX switch 431 (e.g., at the drain of a transistor that may comprise the TX switch 431), the voltage depending on whether the TRSW circuit is operating in a transmit or receive mode.

Coupled transmission lines 421 and 422 may have odd and even mode characteristic impedances that satisfy a specific relation (1/Zoo−1/Zoe=2/RL) where Zoo is the odd-mode characteristic impedance, Zoe is the even-mode characteristic impedance, and RL is the load resistance. The coupled transmission lines 421 and 422 may be designed to perform three functions (1) provide DC decoupling of the drains of the TX and RX switches 431, 432; (2) galvanically isolate the antenna port 410 from the TX and RX switches 431, 432 thereby providing ESD protection; and (3) perform the necessary transformation of a short-circuit impedance of an ON switch (e.g., the TX and/or RX switch 431, 432) to an open-circuit at the antenna port 410.

The TX path may also be connected to a transmitter input port that receives signals from a transmitter (e.g., the power amplifier outputs of the transmitter). As transmitter signals are often balanced (e.g., differential), it may be connected to the TX path via a balun that may be through a balun 461, where the balanced side of balun 461 receives differential inputs from the transmitter while one port on the unbalanced side of balun 461 is connected to the TX path of the TRSW circuit. The other port of the unbalanced side of balun 461 may be connected to a series capacitor 471 that is configured to provide a DC block to ground (e.g., viewed as an open circuit from the perspective of a DC signal) while also providing an RF short to ground (e.g., viewed as a short circuit from the perspective of an RF signal). Typically, this will be a capacitor with a very large capacitance ($C_{big}$). In addition, a shunting capacitor 451 may be connected to the TX path, where the shunting capacitor 451 is configured to provide an RF short to ground and a DC block to ground. The shunting capacitor 451 may be located, for example, at a node that connects the adjustable TX bias circuit 441 to the coupled transmission lines 421.

Similarly, the RX path may also include an RX switch 432 that may switch on and off RF transmission along the RX path by selectively shunting the RF RX signals to ground (e.g., when the TRSW circuit is in a transmit mode). The RX switch 432 may be biased with a RX bias voltage provided by an adjustable RX bias circuit 442 that is configured to selectively apply a DC voltage to the RX switch 432 (e.g., at the drain of a transistor that may comprise the RX switch 432), the voltage depending on whether the TRSW circuit is operating in a transmit or receive mode.

The RX path may also be connected to a receiver output port that provides signals to a receiver (e.g., to the LNA inputs of the receiver chain). As receiver signals are often balanced (e.g., differential), the receiver output port may be connected to the RX path via a balun 462, where the balanced side of balun 462 provides differential outputs to the receiver while one port on the unbalanced side of balun 462 is connected to the RX path of the TRSW circuit. The other port of the unbalanced side of balun 462 may be connected to a series capacitor 472 that is configured to provide a DC block to ground (e.g., viewed as an open circuit from the perspective of a DC voltage) while also providing an RF short to ground (e.g., viewed as a short circuit from the perspective of an RF signal). Typically, the series capacitor 472 will have a very large capacitance ($C_{big}$). In addition, a shunting capacitor 452 may be connected to the TX path, where the shunting capacitor 452 is configured to provide an RF short to ground and a DC block to ground. The shunting capacitor 452 may be located, for example, at a node that connects adjustable RX bias circuit 442 to the coupled transmission lines 422. The shunting capacitor 452 will also typically have a very large capacitance ($C_{big}$).

The RX switch 432 and TX switch 431 may each be controlled by a respective enable signal to switch on or off the respective TX/RX path (e.g., $EN_{RX}$ is high when the RX path is to be enabled and $EN_{TX}$ is high when the TX path is to be enabled), depending on whether the device is to be operated in a transmit mode or a receive mode (e.g., to select whether the antenna 410 is to be used for transmitting RF signals or receiving RF signals). In general, the modes are exclusive, meaning that when the antenna 410 is to be used for transmitting ($EN_{TX}$ is high), the TX path should conduct RF signals through the TX path to the antenna 410 and the RX path should not conduct RF signals through the RX path to the antenna 410. Conversely, when the antenna 410 is to be used for receiving ($EN_{RX}$ is high), the RX path should conduct RF signals through the RX path to the antenna 410 and the TX path should not conduct RF signals through the TX path to the antenna 410.

In the example shown in FIG. 4, the TX switch 431 is a transistor that may be controlled by the receiver enable signal ($EN_{RX}$) that is connected to the gate node of the transistor. The drain of the transistor is connected to the TX path while the source of the transistor is connected to ground. Thus, when the receiver enable signal goes high, the transistor of TX switch 431 turns on to conduct the TX path to ground. When the receiver enable signal goes low, the transistor of TX switch 431 turns off, presenting an RF open circuit to the TX path. On the receiver side, the RX switch 432 is a transistor that may be controlled by the transmitter enable signal ($EN_{TX}$) that is connected to the gate node of the transistor. The drain of the transistor is connected to the RX path while the source of the transistor is connected to ground. Thus, when the transmitter enable signal goes high, the transistor of RX switch 432 turns on to conduct the RX path to ground. When the transmitter enable signal goes low, the transistor of RX switch 431 turns off, presenting an RF open circuit to the RX path. As should be appreciated, while the descriptions herein describe various conducting paths as presenting a "short" (or "shunting") or "open" (or "blocking") from the perspective DC voltages or RF signals, these terms should be understood as approximate. Thus, when a conducting path is described as being "shorted" from the perspective of a particular signal (e.g., a DC voltage or an RF signal), this should be understood as presenting a very low impedance to that particular signal. Similarly, when a conducting path is described as presenting an "open" circuit, from the perspective of a particular signal, this should be understood as presenting a very high impedance to that particular signal.

The TX/RX switch that is to be turned off may be biased independently from the TX/RX switch that is to be turned on. In other words, the drains of the TX and RX switches 431, 432 may be biased independently from one another via an adjustable biasing circuit (e.g., adjustable TX bias circuit 441 and adjustable RX bias circuit 442) that may include a logic element. In the example of FIG. 4, the respective logic element is an inverter (441*a*, 442*a*) that selectively applies a DC bias voltage to the respective switch (e.g., inverter 441*a* may provide a bias voltage to the drain of TX switch 431 and, independently, inverter 442*a* may provide a bias voltage to the drain of RX switch 432). Though an inverter is used as the logic element, it should be understood that the adjustable biasing circuit may use any type of logic element(s) or other voltage source to provide the bias voltage. The adjustable bias circuits (441, 442) may bias a respective drain of the TX/RX switch (431, 432) to a predefined voltage level when the switch is switched off. For example, the predefined voltage level may be the nominal supply voltage or $V_{dd,\ bias}$ or any voltage level greater than zero. This allows for larger RF swings to appear on the respective transmission line without the RF swings inadvertently causing the switch on the transmission line to turn on, providing for improved linearity. The adjustable bias circuits (441, 442) may bias a respective drain of the TX/RX switch (431, 432) to zero volts when the switch is switched on.

For example, if the TX switch 431 is supposed to be turned off (e.g., when the TRSW circuit is in a transmitter mode), the drain of the TX switch 431 may be biased with a DC voltage level of $V_{dd,\ bias}$ so that large RF swings that may appear on the TX path helps prevent the TX switch 431 from inadvertently turning on, thereby improving the linearity of the TX path. When the RX switch 432 is supposed to be turned off (e.g., when the TRSW circuit is in a receiver mode), the drain of the RX switch 432 may be biased with a DC voltage level of $V_{dd,\ bias}$ so that large RF swings that may be received on the RX path helps prevent the RX switch 432 from turning on inadvertently, thereby improving the linearity of the RX path. As should be appreciated, an adjustable bias circuit (441, 442) may be used on either the TX path (e.g., by TX bias circuit 441) or the RX path (e.g., by RX bias circuit 442), both the TX path and the RX path, or neither the TX path nor the RX path.

In the example of FIG. 4, the enable signal for one RF path is provided as the input to the respective adjustable biasing circuit of the other RF path so as to provide mutually exclusive operation of one of the paths. Thus, when the TRSW circuit is in a transmit mode (e.g., the receiver enable signal ($EN_{RX}$) is low), the inverter 441*a* may provide a high bias voltage (e.g., $V_{dd,\ bias}$) to the TX path by inverting the low receiver enable signal ($EN_{RX}$). This high bias voltage is output by the inverter 441*a* to the drain of the TX switch 431 (which is in the off mode because the TRSW circuit is in the transmit mode and $EN_{RX}$ is low), reducing the likelihood that the RF transmissions will cause the TX switch 431 to inadvertently switch on. At the same time on the receive side, when the transmitter is enabled, the RX switch 432 is switched on, and the RX bias circuit 442 may provide zero volts to the drain of the RX switch 432 (e.g., via $INV_{RX}$ which is low because the transmit enable signal ($EN_{TX}$) is high). Hence, RX switch 432 operates in the triode region and appears as a short circuit (e.g., a very low impedance) to the coupled transmission lines 422. The coupled transmission lines 422 transforms this to an open circuit at the antenna port 410, effectively eliminating the effect of the RX path on the TX path when in the transmit mode.

Similarly, when the TRSW circuit is in a receive mode (e.g., the transmit enable signal ($EN_{TX}$) is low), the inverter 441*a* may provide a high bias voltage (e.g., $V_{dd,\ bias}$) to the RX path by inverting the low transmit enable signal ($EN_{TX}$) as $INV_{RX}$. This high bias voltage is output by the inverter 442*a* to the drain of the RX switch 432 (which is in the off mode because the TRSW is in the receive mode and $EN_{TX}$ is low), reducing the likelihood that the received RF signals will cause the RX switch 432 to inadvertently switch on. On the transmit side, when the receiver is enabled, the TX switch 431 is switched on, and the TX bias circuit 441 provides zero volts to the drain of the TX switch 431 (e.g., via $INV_{TX}$ which is low because the transmit enable signal ($EN_{RX}$) is high). Hence, TX switch 431 operates in the triode region and appears as a short circuit (e.g., a very low impedance) to the coupled transmission lines 421. The coupled transmission lines 421 transforms this to an open circuit at the antenna port 410, effectively eliminating the effect of the TX path on the RX path when in the receive mode.

As noted above, large RF swings that may appear on the TX/RX paths when the respective TX/RX switches (e.g., 431, 432) are intended to be off may cause them to unintentionally turn on, negatively impacting the linearity of the TX/RX path. For instance, consider a conventional TRSW switch (such as M1 and M2 shown in FIG. 2) that is operating in the transmitter mode. The TX switch (e.g., M2 of FIG. 2) is intended to be OFF (Vg=0 V) and the RX switch (e.g., M1 of FIG. 2) is intended to be ON (Vg=1 V). This forces the drain of the TX switch to be at 0 V since the drains of the RX and TX switch are electrically shorted at DC. When a large swing appears on the TX switch (e.g., from the PA output along the TX path), the drain voltage may see significantly large negative values, depending on the output power from the PA. This has two unintended consequences: (1) the intended OFF TX switch may inadvertently turn-on in the reverse direction (e.g., drain and source are effectively reversed, and current flows into the circuit from ground); and (2) the drain-bulk junction diode may turn on due to a negative voltage applied across the drain-bulk ($V_{db}$).

Figure 5:
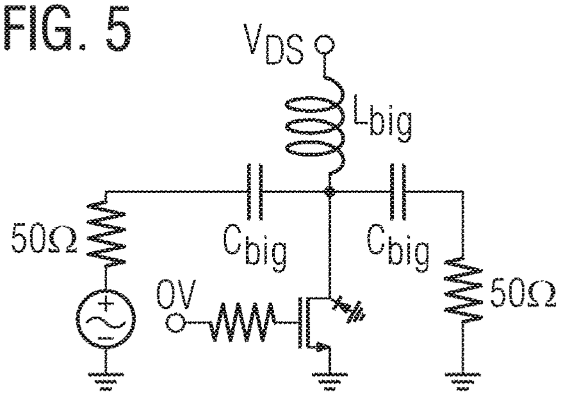
FIG. 5 shows an exemplary shunting switch evaluation circuit.
Figure 6A:
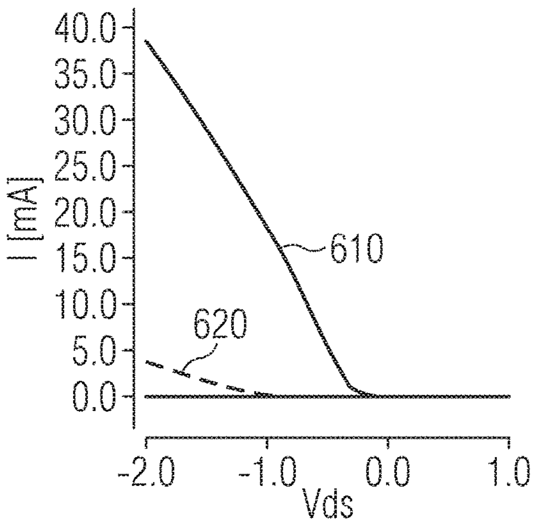
FIG. 6A shows the impact on current flow through the shunting switch of FIG. 5 as a function of the drain voltage.
Figure 6B:
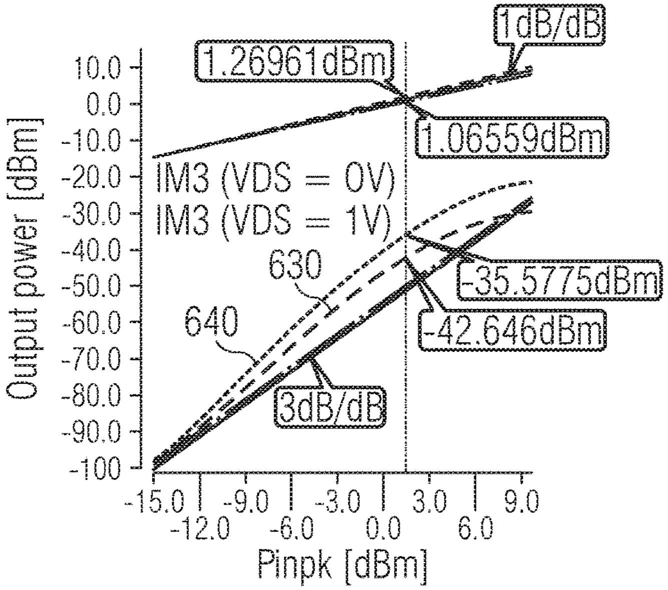
FIG. 6B shows the impact on output power as a function of peak input power when the drain of the shunting switch of FIG. 5 is biased to various bias voltages.

These phenomena are illustrated in FIG. 6A that plots a simulated source current (I) as a function of drain voltage (Vds) for a switch (e.g., M2 of FIG. 2), where as the drain voltage becomes negative, the source current (plotted on line 610) drastically rises at Vds=~−0.2 V (e.g., due to source-drain reversal) and the bulk current (plotted on line 620) rises at around Vds=~−0.9 V. By contrast, FIG. 6B demonstrates what may occur when employing the improved TRSW circuit, where the drain of the OFF switch device is DC biased at a sufficiently high voltage (e.g. Vdd). The DC bias voltage means that it takes a much larger voltage swing (and hence RF power) to inadvertently turn ON an OFF the switch. FIG. 6B plots the simulation results of an exemplary circuit such as that shown in FIG. 5, where the drain of the transistor switch is biased to different voltages. As shown in FIG. 6B, even at higher power levels, the third order intermodulation nonlinearity (IM3) component generated by an OFF device may be reduced by 7 dB or more when the drain is biased to 1 V (plotted on line 630, showing −42.646 dBm at the dotted vertical line) rather than when biased to 0 V (plotted on line 640, showing −35.5775 dBm at the dotted vertical line). The desired fundamental power for both cases are effectively unchanged (within 0.2 dB of each other) as shown in the linear plots on top half of FIG. 6B. This illustrates that the reduced IM3 (when the drain is biased to 1 V) will result in a linearity improvement (as measured by the ratio of the power of the fundamental to the power of the nonlinearity).

Figure 7A:
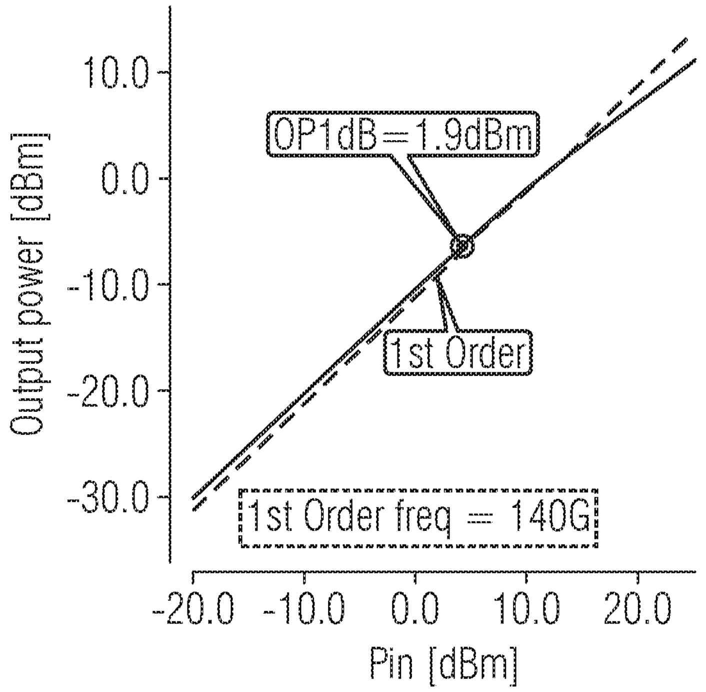
FIG. 7A shows an example of output power as a function of input power for the conventional TRSW of FIG. 3B.
Figure 7B:
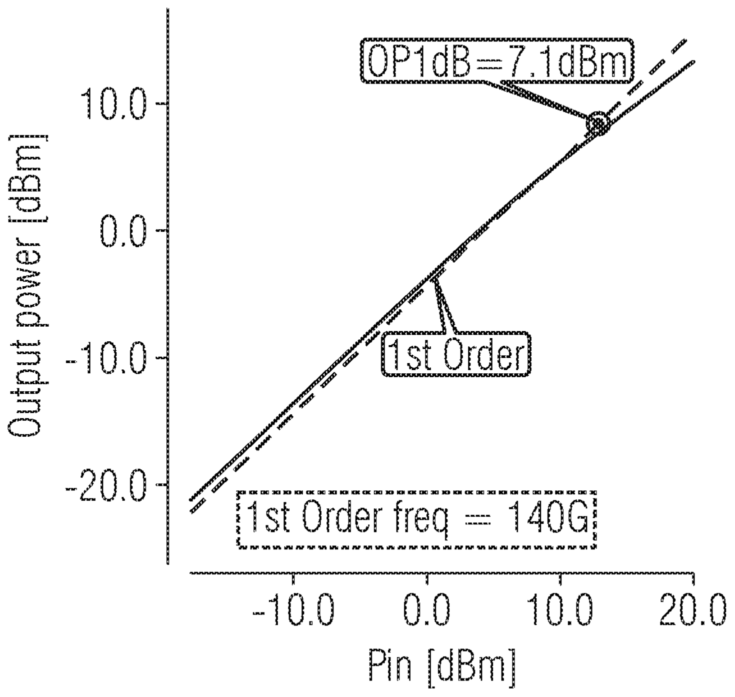
FIG. 7B shows an example of output power as a function of input power for the improved TRSW of FIG. 4.

FIGS. 7A and 7B allow for comparing the linearity of a conventional TRSW with an ESD protective channel matching network (e.g., shown in FIG. 3B) with the linearity of an improved TRSW (e.g., similar to the example shown in FIG. 4, where an adjustable bias circuit has been applied to only the TX side (e.g., including TX bias circuit 441 but not RX bias circuit 442). The plots in FIGS. 7A and 7B are for simulated circuits designed to operate with RF frequencies in the D-band (e.g., a 140 GHz center frequency). FIG. 7A shows the simulated results for the conventional TRSW, which achieves only 1.9 dBm of $OP_{1dB}$ while FIG. 7B shows the simulated results for the improved TRSW which achieves 7.1 dBm of $OP_{1dB}$. In other words, the improved TRSW achieves a 5.2 dB improvement.

Figure 8A:
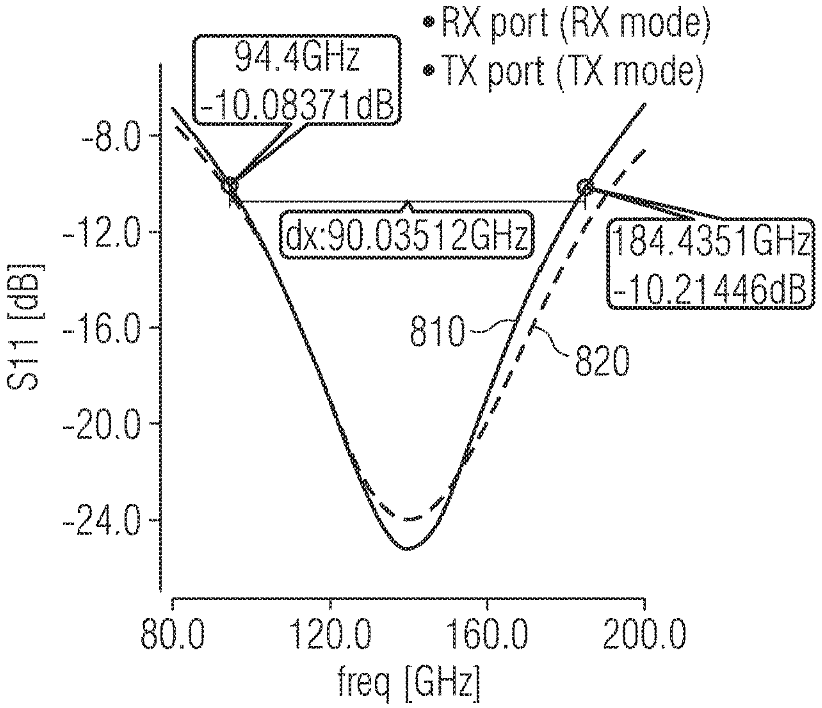
FIG. 8A shows an example of the quality of impedance match (as measured by $S_{11}$) that may be achieved at the RX port and TX port in receive mode and transmit mode, respectively when using the improved TRSW of FIG. 4.
Figure 8B:
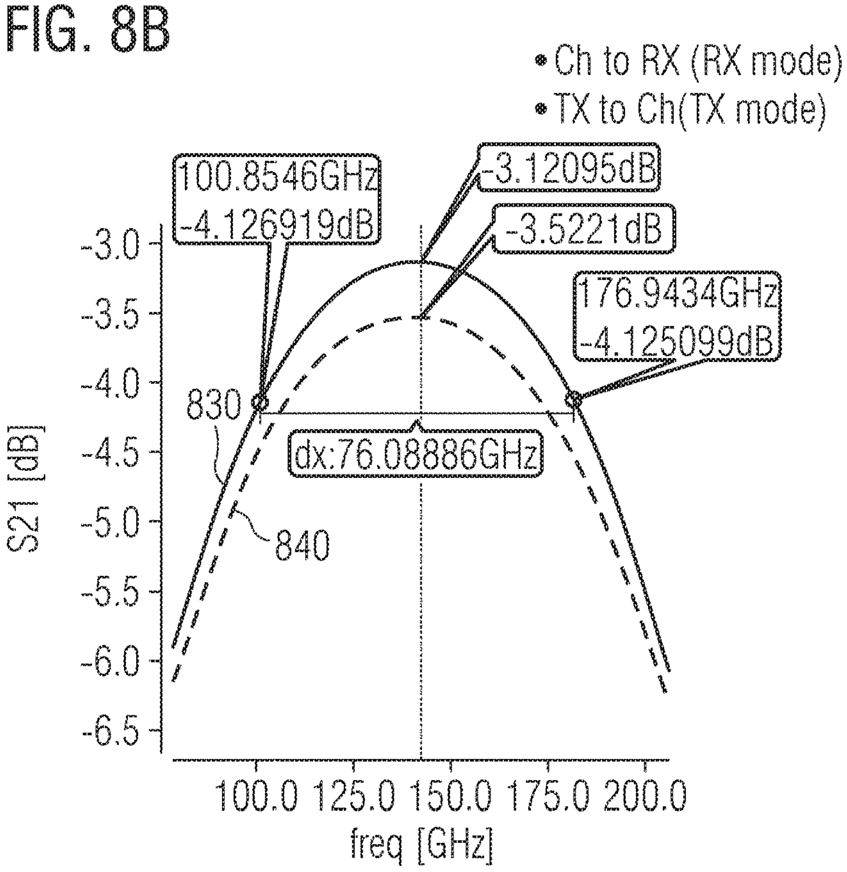
FIG. 8B shows an example of the frequency response through the improved TRSW of FIG. 4 (as measured by $S_{21}$) for the antenna to RX port and from the TX port to the antenna in receive mode and transmit mode, respectively.

FIGS. 8A and 8B show simulated insertion losses for an exemplary matching network of the improved TRSW (e.g., for the example shown in FIG. 4). FIG. 8A shows the return loss ($S_{11}$) (where line 810 plots the return loss of the RX port when in RX mode and line 820 plots return loss of the TX port when in TX mode) and FIG. 8B shows the insertion loss ($S_{21}$) (where line 830 plots the antenna port to RX port insertion loss when in RX mode and line 840 plots the TX port to antenna port insertion loss when in TX mode) of the matching network. The improved TRSW shows a less than −10 dB matching bandwidth of 90 GHz and a TX/RX mode loss of 3.5 dB and 3.1 dB respectively. The improved TRSW also shows that an $S_{21}$ 1 dB bandwidth of 76 GHz may be attained, resulting in a low-loss, broadband, and highly-linear TRSW circuit.

In the following, various examples are provided that may include one or more features of the TRSW circuits described above. The examples provided in relation to the devices may apply also to the described method(s), and vice versa.

Example 1 is a radio frequency (RF) circuit including an antenna coupled to a receive path through a first coupled transmission line, the antenna also coupled to a transmit path through a second coupled transmission line. The RF circuit also includes a receiver switch configured to selectively present to the receive path a high impedance or a low impedance to ground. The RF circuit also includes a transmitter switch configured to selectively present to the transmit path a high impedance or a low impedance to ground.

Example 2 is the RF circuit of example 1, wherein the RF circuit further includes a receive path bias network configured to supply a receive path bias voltage to the receive path to bias the receiver switch.

Example 3 is the RF circuit of example 2, wherein the receive path bias network is configured to supply the receive path bias voltage based on a transmitter enable signal, wherein the receiver switch is configured to selectively present to the receive path the high impedance or the low impedance to ground based on the transmitter enable signal.

Example 4 is the RF circuit of example 1, wherein the RF circuit further includes a transmit path bias network configured to supply a transmit path bias voltage to the transmit path to bias the transmitter switch.

Example 5 is the RF circuit of example 4, wherein the transmit path bias network is configured to supply the transmit path bias voltage based on a receiver enable signal, wherein the transmitter switch is configured to selectively present to the transmit path the high impedance or the low impedance to ground based on the receiver enable signal.

Example 6 is the RF circuit of example 2, wherein the receive path bias network includes a logic gate configured to invert the transmitter enable signal.

Example 7 is the RF circuit of example 5, wherein the transmit path bias network includes a logic gate configured to invert the receiver enable signal.

Example 8 is the RF circuit of example 6, wherein the logic gate includes an inverter.

Example 9 is the RF circuit of example 1, wherein the RF circuit is configured to operate in a receive mode or a transmit mode, wherein when in the receive mode, the transmitter switch presents to the transmit path the low impedance to ground based on a receiver enable signal, wherein when in the transmit mode, the receiver switch presents to the receive path the low impedance to ground based on a transmitter enable signal.

Example 10 is the RF circuit of example 2, wherein the receiver switch includes a field effect transistor including a drain node and a gate node, wherein the drain node is connected to the receive path, wherein the gate node is configured to receive the transmitter enable signal, wherein the receive path bias network is configured to, if the transmitter enable signal is enabled, supply zero volts as the receive path bias voltage at the drain node.

Example 11 is the RF circuit of example 10, wherein the receive path bias network is configured to, if the transmitter enable signal is not enabled, supply greater than zero volts as the receive path bias voltage at the drain node.

Example 12 is the RF circuit of example 3, wherein the transmitter switch includes a field effect transistor including a drain node and a gate node, wherein the drain node is connected to the transmit path, wherein the gate node is configured to receive the receiver enable signal, wherein the transmit path bias network is configured to, if the receiver enable signal is enabled, supply zero volts as the transmit path bias voltage at the drain node.

Example 13 is the RF circuit of example 12, wherein the transmit path bias network is configured to, if the receiver enable signal is not enabled, supply greater than zero volts as the transmit path bias voltage at the drain node.

Example 14 is the RF circuit of example 1, wherein the first coupled transmission line and the second coupled transmission line each includes a quarter-wavelength impedance transformation.

Example 15 is the RF circuit of example 1, wherein the first coupled transmission line includes a first transmission line and a second transmission line that is a same length as the first transmission line, wherein the first transmission line is connected to the receive path, wherein the second transmission line is connected to the antenna.

Example 16 is the RF circuit of example 15, wherein first transmission line is galvanically isolated from the second transmission line.

Example 17 is the RF circuit of example 1, wherein if the receiver switch is configured to present to the receive path the low impedance, the first coupled transmission line is configured to transform the low impedance at the receive path so as to present to the antenna port an RF open circuit.

Example 18 is the RF circuit of example 15, the RF circuit further including a shunting capacitor connected to the first transmission line, wherein the shunting capacitor is configured to shunt RF signals to ground that are at RF receive frequencies of the RF circuit.

Example 19 is the RF circuit of example 1, wherein the second coupled transmission line includes a first transmission line and a second transmission line that is a same length as the first transmission line, wherein the first transmission line is connected to the transmit path, wherein the second transmission line is connected to the antenna.

Example 20 is the RF circuit of example 19, wherein first transmission line is galvanically isolated from the second transmission line.

Example 21 is the RF circuit of example 1, wherein if the transmitter switch is configured to present to the transmit path the low impedance, the second coupled transmission line is configured to transform the low impedance at the transmit path so as to present to the antenna port an RF open circuit.

Example 22 is the RF circuit of example 19, the RF circuit further including a shunting capacitor connected to the first transmission line, wherein the shunting capacitor is configured to shunt RF signals to ground that are at RF transmit frequencies of the RF circuit.

Example 23 is the RF circuit of example 1, wherein the receive path feeds into an unbalanced side of a balun, wherein one terminal of the unbalanced side is connected to a series capacitor configured to present to the one terminal an RF short and DC open to ground, wherein another terminal of the unbalanced side is connected to the receive path.

Example 24 is the RF circuit of example 1, wherein the transmit path feeds into an unbalanced side of a balun, wherein one terminal of the unbalanced side is connected to a series capacitor configured to present to the one terminal an RF short and DC open to ground, wherein another terminal of the unbalanced side is connected to the transmit path.

Example 25. The device of example 1, wherein the first coupled transmission line includes an even mode characteristic impedance and an odd mode characteristic impedance, wherein the even mode characteristic impedance minus the odd mode characteristic impedance is twice a load resistance of the first transmission line.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A radio frequency (RF) circuit comprising:

an antenna coupled to a receive path through a first coupled transmission line comprising a first pair of spaced apart transmission lines that galvanically isolates the receive path from the antenna, the antenna also coupled to a transmit path through a second coupled transmission line comprising a second pair of spaced apart transmission lines that galvanically isolates the transmit path from the antenna; and a receiver switch configured to selectively present to the receive path an open circuit or a short circuit to ground; and a transmitter switch configured to selectively present to the transmit path an open circuit or a short circuit to ground.

2. The RF circuit of claim 1, wherein the RF circuit further comprises a receive path bias network configured to supply a receive path bias voltage to the receive path to bias the receiver switch.

3. The RF circuit of claim 2, wherein the receive path bias network is configured to supply the receive path bias voltage based on a transmitter enable signal, wherein the receiver switch is configured to selectively present to the receive path the open circuit or the short circuit to ground based on the transmitter enable signal.

4. The RF circuit of claim 3, wherein the receive path bias network comprises a logic gate configured to invert the transmitter enable signal.

5. The RF circuit of claim 4, wherein the logic gate comprises an inverter.

6. The RF circuit of claim 1, wherein the RF circuit further comprises a transmit path bias network configured to supply a transmit path bias voltage to the transmit path to bias the transmitter switch.

7. The RF circuit of claim 6, wherein the transmit path bias network is configured to supply the transmit path bias voltage based on a receiver enable signal, wherein the transmitter switch is configured to selectively present to the transmit path the open circuit or the short circuit to ground based on the receiver enable signal.

8. The RF circuit of claim 7, wherein the transmit path bias network comprises a logic gate configured to invert the receiver enable signal.

9. The RF circuit of claim 7, wherein the transmitter switch comprises a field effect transistor comprising a drain node and a gate node, wherein the drain node is connected to the transmit path, wherein the gate node is configured to receive the receiver enable signal, wherein the transmit path bias network is configured to, if the receiver enable signal is enabled, supply zero volts as the transmit path bias voltage at the drain node.

10. The RF circuit of claim 9, wherein the transmit path bias network is configured to, if the receiver enable signal is not enabled, supply greater than zero volts as the transmit path bias voltage at the drain node.

11. The RF circuit of claim 1, wherein the RF circuit is configured to operate in a receive mode or a transmit mode, wherein when in the receive mode, the transmitter switch presents to the transmit path the short circuit to ground based on a receiver enable signal, wherein when in the transmit mode, the receiver switch presents to the receive path the short circuit to ground based on a transmitter enable signal.

12. The RF circuit of claim 11, wherein the receiver switch comprises a field effect transistor comprising a drain node and a gate node, wherein the drain node is connected to the receive path, wherein the gate node is configured to receive the transmitter enable signal, wherein the receive path bias network is configured to, if the transmitter enable signal is enabled, supply zero volts as the receive path bias voltage at the drain node.

13. The RF circuit of claim 12, wherein the receive path bias network is configured to, if the transmitter enable signal is not enabled, supply greater than zero volts as the receive path bias voltage at the drain node.

14. The RF circuit of claim 1, wherein the first coupled transmission line and the second coupled transmission line each comprises a quarter-wavelength impedance transformation.

15. The RF circuit of claim 1, wherein the first pair of spaced apart transmission lines comprises:

a first transmission line; and a second transmission line that is a same length as the first transmission line, wherein the first transmission line is connected to the receive path, wherein the second transmission line is connected to the antenna.

16. The RF circuit of claim 15, the RF circuit further comprising a shunting capacitor connected to the first transmission line, wherein the shunting capacitor is configured to shunt RF signals to ground that are at RF receive frequencies of the RF circuit.

17. The RF circuit of claim 1, wherein if the receiver switch is configured to present to the receive path the short circuit to ground, the first coupled transmission line is configured to transform the short circuit at the receive path so as to present to the antenna port an RF open circuit.

18. The RF circuit of claim 1, wherein the receive path feeds into an unbalanced side of a balun, wherein one terminal of the unbalanced side is connected to a series capacitor configured to present to the one terminal an RF short and DC open to ground, wherein another terminal of the unbalanced side is connected to the receive path.

19. The RF circuit of claim 1, wherein the first coupled transmission line comprises an even mode characteristic impedance and an odd mode characteristic impedance, wherein the even mode characteristic impedance minus the odd mode characteristic impedance is twice a load resistance of the first transmission line.

20. A transmit-receive switch configurable between a receive mode and a transmit mode comprising:

a receive port for outputting received radio-frequency signals;

a transmit port for receiving radio-frequency signals to transmit;

an antenna connected to the receive port through a receive path and a first coupled transmission line comprising a first pair of spaced apart transmission lines that galvanically isolates the receive path from the antenna, the antenna also connected to the transmit port through a transmit path and a second coupled transmission line comprising a second pair of spaced apart transmission lines that galvanically isolates the transmit path from the antenna; and a receiver switch connected to the receive path and configured to selectively present an open circuit to the receive path when the transmit-receive switch is in the receive mode and a short circuit to ground when the transmit-receive switch is in the transmit mode; and a transmitter switch connected to the transmit path and configured to selectively present an open circuit to the transmit path when the transmit-receive switch is in the transmit mode and short circuit to ground when the transmit-receive switch is in the receive mode.

21. The transmit-receive switch of claim 20, the transmit-receive switch further comprising:

a receive path bias network configured to bias the receiver switch with a receive path bias voltage when the transmit-receive switch is in the transmit mode; and a transmit path bias network configured to bias the transmitter switch with a transmit path bias voltage when the transmit-receive switch is in the receive mode.

22. A radio-frequency (RF) switching circuit comprising:

a receive port connected to a balanced side of a receive balun;

a transmit port connected to a balanced side of a transmit balun;

an antenna coupled to an unbalanced side of the receive balun through a first coupled transmission line, the antenna also coupled to an unbalanced side of the transmit balun through a second coupled transmission line; and a first field-effect transistor connected to the first coupled transmission line and the unbalanced side of the receive balun at a receive path node, where in the first field-effect transistor is configured to selectively present an open circuit to the receive path node when the RF switching circuit is in a receive mode or a short circuit to the receive path node when the RF switching circuit is in a transmit mode; and a second field-effect transistor connected to the second coupled transmission line and the unbalanced side of the transmit balun at a transmit path node, where in the second field-effect transistor is configured to selectively present an open circuit to the transmit path node when the RF switching circuit is in the transmit mode or a short circuit to ground when the RF switching circuit is in the receive mode.

23. The RF switching circuit of claim 22, wherein the first and second field effect transistors each comprise a drain node and a gate node, wherein the drain node of the first field effect transistor is connected to the receive path node and configured to receive a receive path bias voltage based on whether the RF switching circuit is in the transmit mode or the receive mode, wherein the gate node of the first field effect transistor is configured to receive a transmitter enable signal when the RF switching circuit is in the transmit mode, wherein if the transmitter enable signal is enabled, the receive path bias voltage is zero volts and if the transmitter enable signal is disabled, the receive path bias voltage is greater than zero volts, wherein the drain node of the second field effect transistor is connected to the transmit path node and configured to receive a transmit path bias voltage based on whether the RF switching circuit is in the transmit mode or the receive mode, wherein the gate node of the second field effect transistor is configured to receive a receiver enable signal when the RF switching circuit is in the receive mode, wherein if the receiver enable signal is enabled, the transmit path bias voltage is zero volts and if the receiver enable signal is disabled, the transmit path bias voltage is greater than zero volts.

* * * * *